United States Patent
Biermann et al.

(10) Patent No.: US 7,969,444 B1
(45) Date of Patent: Jun. 28, 2011

(54) DISTRIBUTED RENDERING OF TEXTURE DATA

(75) Inventors: Ralf Biermann, Aachen (DE); Barthold B. Lichtenbelt, Fort Collins, CO (US); Ross A. Cunniff, Fort Collins, CO (US); Jeffrey F. Juliano, Cary, NC (US); Jeffrey A. Bolz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1204 days.

(21) Appl. No.: 11/609,820

(22) Filed: Dec. 12, 2006

(51) Int. Cl.
*G06F 15/16* (2006.01)
*G09G 5/36* (2006.01)

(52) U.S. Cl. ........................................ 345/502; 345/545

(58) Field of Classification Search .................. 345/502, 345/505, 582, 543, 544, 545
See application file for complete search history.

(56) References Cited

U.S. PATENT DOCUMENTS

| | | | |
|---|---|---|---|
| 5,586,234 A * | 12/1996 | Sakuraba et al. | 345/582 |
| 5,757,374 A * | 5/1998 | Nakamura et al. | 345/588 |
| 5,767,858 A * | 6/1998 | Kawase et al. | 345/552 |
| 6,760,031 B1 * | 7/2004 | Langendorf et al. | 345/502 |
| 6,924,799 B2 * | 8/2005 | Lefebvre et al. | 345/419 |
| 2005/0041031 A1 * | 2/2005 | Diard | 345/505 |

* cited by examiner

*Primary Examiner* — Kee M Tung
*Assistant Examiner* — Jacinta Crawford
(74) *Attorney, Agent, or Firm* — Patterson & Sheridan, LLP

(57) ABSTRACT

A method and apparatus for distributing the workload of rendering an image where texture mapping is involved among multiple graphics processing units (GPUs) are provided. The method generally entails dividing a texture map among multiple GPUs, performing texture mapping in each GPU to render image data in each GPU's frame buffer, combining the image data from each frame buffer, and scanning out the combined image to a display.

18 Claims, 4 Drawing Sheets

DISTRIBUTED RENDERING OF TEXTURE DATA

BACKGROUND OF THE INVENTION

1. Field of the Invention

Embodiments of the present invention generally relate to graphics processing and, more particularly, to rendering images on systems with multiple graphics processing units (GPUs).

2. Description of the Related Art

Computer graphics image data typically undergoes several processing steps before each graphics frame is completely rendered for display or storage. Each processing step typically operates on graphics image data utilizing programming steps defined through an application programming interface (API), enabling the graphics application to utilize high performance hardware, such as a graphics processing unit (GPU), to execute a set of processing steps with minimal real-time supervision from a host central processing unit (CPU). For example, a software application executing on the host CPU may use an API to program processing steps in a GPU including physics, geometric transform, polygon setup, rasterization and pixel shading, resulting in the generation of complex graphics image frames for display or storage with minimal impact on the host CPU performance.

Historically, computing devices have included only one GPU that was responsible for both processing graphics commands and displaying the resulting images. With only one GPU, questions about how to distribute work among multiple processing devices never really arose. However, as graphics applications begin to implement more steps with greater complexity in each step, the computational load on the GPU executing the processing steps increases, resulting in diminished overall rendering performance.

One approach to improving overall processing time has been to configure multiple GPUs to concurrently process a single graphics frame or assign multiple GPUs to process alternating graphics frames. Such approaches generally involve synchronizing the GPUs to simultaneously render portions of the same frame or sequential frames to increase overall rendering performance. However, in current systems where multiple GPUs concurrently process a single frame, the graphics application has no way to inform the GPUs of the spatial locality of the processed image data. All of the rendered data from each GPU has to be copied to all of the other GPUs to form a combined image, thereby limiting the overall system performance. This applies in particular to generating texture data at run-time by sending rendering commands to the GPUs that store the rendering results in the texture map memory storage. Several common usage patterns of rendering texture data imply that sections of the texture data are only accessed by a subset of GPUs, so not all of the rendered texture data has to be copied to all other GPUs.

Accordingly, what is needed is an improved method of rendering texture data in a multi-GPU system with enhanced system performance.

SUMMARY OF THE INVENTION

One embodiment of the present invention is a method for distributed rendering of texture data in a plurality of graphics processing units (GPUs). The method generally includes dividing a texture map into a plurality of texture map sections, wherein each texture map section is associated with one of the plurality of GPUs; performing texture mapping in each of the plurality of GPUs with the associated texture map section to render image data in a frame buffer corresponding to each GPU; and combining the rendered image data from each of the GPUs, where the size of the texture map is related to the size of the combined image by a scaling factor.

Another embodiment of the present invention provides a graphics processing system for distributed rendering of texture data from a texture map. The graphics processing system generally includes a plurality of GPUs, wherein each of the plurality of GPUs is configured to perform texture mapping on a texture map section from the texture map to render image data without replicating the rendered image data to the other GPUs in the plurality; and a means for combining the rendered image data, wherein the size of the texture map is related to the size of the combined image by a scaling factor.

Yet another embodiment of the present invention provides a computing system for distributed rendering of texture data from a texture map. The computing system generally includes a central processing unit (CPU) subsystem for running a graphics application; a plurality of GPUs coupled to the CPU subsystem, wherein the graphics application utilizes an application programming interface (API) to control the plurality of GPUs such that each of the plurality of GPUs performs texture mapping on a texture map section from the texture map to render image data without replicating the rendered image data to the other GPUs in the plurality; and a means for combining the rendered image data to form a frame requested by the graphics application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide techniques (and corresponding apparatus) for distributing the workload of rendering an image where texture mapping is involved among multiple graphics processing units (GPUs). The techniques generally entail dividing a texture map among multiple GPUs, performing texture mapping in each GPU to render image data in each GPU's frame buffer, combining the image data from each frame buffer, and scanning out the combined image to a display.

An Exemplary Multi-GPU System

Figure 1:
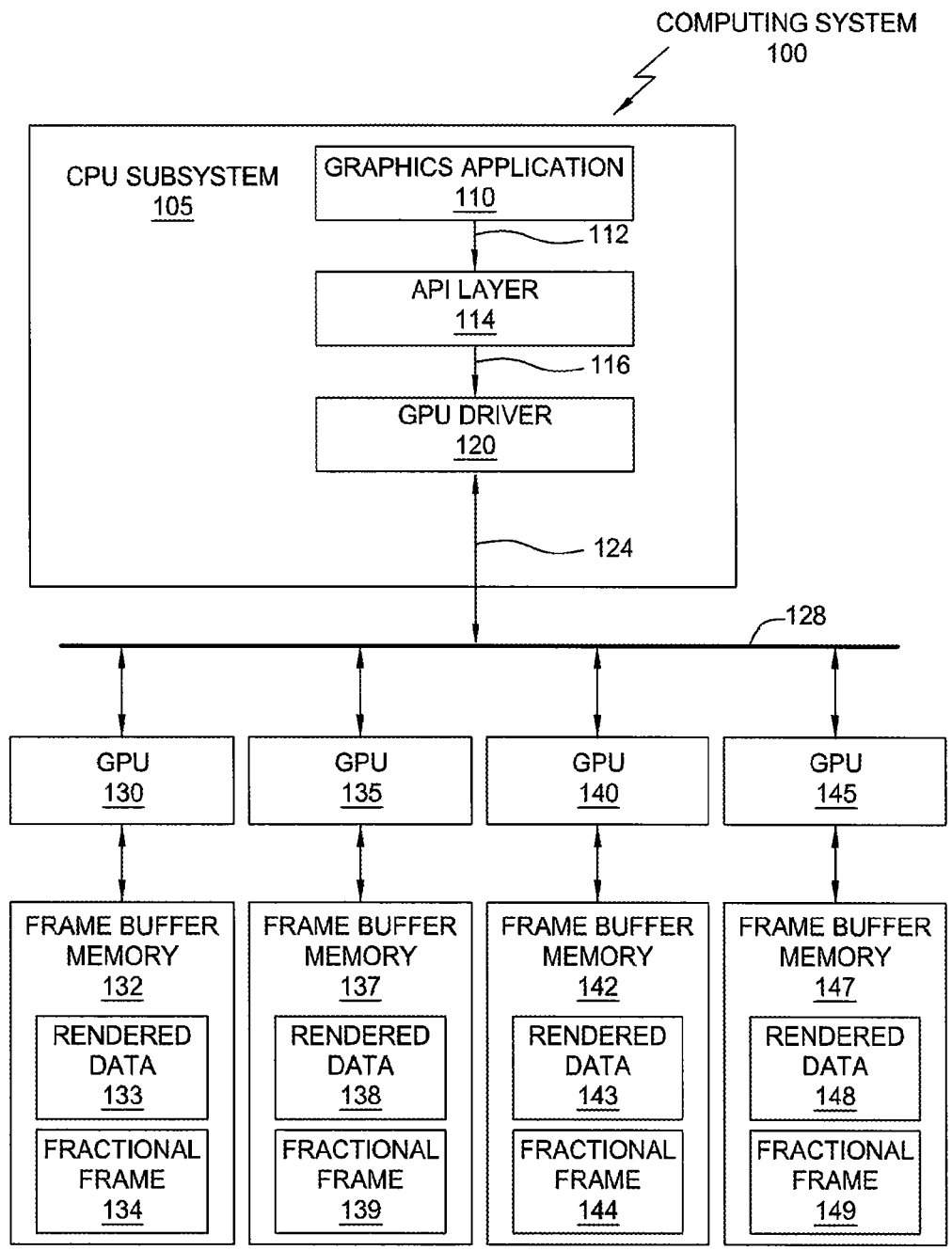
FIG. 1 is a block diagram of a computing device for performing distributed rendering of texture data in accordance with an embodiment of the invention.

FIG. 1 is a conceptual diagram of a multi-GPU computing system 100 that may be used for performing distributed rendering of texture data according to one embodiment of the invention. The system 100 may include a central processing unit (CPU) subsystem 105 and two or more GPUs (four are shown) 130, 135, 140, 145. The CPU subsystem 105 may include the necessary well-known hardware and software elements to support a typical software application environment. A graphics application 110 may execute on the CPU subsystem 105. The graphics application 110 may be, for example, a graphics-based game, a visualization tool, or a graphics-based design tool. In the course of execution, the graphics application 110 may generate a sequence of frames in response to certain input. Each frame may include a set of rendering instructions that, when executed, may generate one frame of a scene at a specific camera view, for example. The scene may include objects that are themselves rendered or drawn upon rendered data.

An application programming interface (API) layer 114 may provide a set of procedural entry points (also known as "API calls") for the graphics application 110 to access underlying resources in the computing system 100, such as the GPU driver 120. The API calls may include, without limitation, functions to generate the sequence of rendered frames on the GPUs 130, 135, 140, 145. The graphics application 110 may convey data 112 related to generating the sequence of frames to the API layer 114 via API calls.

The API layer 114 may process the API calls, creating, without limitation, any resulting data and stored state useful in implementing the API calls. The API layer 114 may further process the API calls and convey frame and control data 116 via a sequence of calls to the GPU driver 120. The GPU driver 120 may transmit rendering commands 124 to the GPUs 130, 135, 140, 145 over a system interconnect 128, such as a high-speed bus. For some embodiments, the computing system 100 may employ more than one GPU driver, each driver managing either one or multiple GPUs.

Each GPU 130, 135, 140, 145 may be coupled to a locally attached frame buffer memory 132, 137, 142, 147, respectively. The frame buffer memory may be utilized when performing texture mapping operations at run-time. For some embodiments, the frame buffer memory may be embedded in the GPU. The frame buffer memory 132, 137, 142, 147 may have a portion reserved for rendered data 133, 138, 143, 148, respectively. Another portion of the frame buffer memory 132, 137, 142, 147 may be reserved for a fractional frame (a portion of a complete frame to display a scene) 134, 139, 144, 149, respectively. Fractional frames are described in more detail below.

Although not shown in FIG. 1, a display may be attached to the computing system 100 and associated with the multiple GPUs 130, 135, 140, 145 for displaying images scanned out from the multiple fractional frames 134, 139, 144, 149 in frame buffer memory 132, 137, 142, 147. The display may be a cathode ray tube (CRT), a liquid crystal display (LCD), a plasma display, or any other appropriate display device.

An Exemplary Method of Distributed Rendering of Texture Data

Methods described herein may distribute the rendering workload among multiple GPUs using any suitable techniques. One method of distributed rendering according to embodiments of the invention may be similar to a multi-GPU rendering technique known as Split Frame Rendering (SFR). In SFR, each GPU manages and renders a different fraction of the image (i.e., a group of spatially coherent pixels, usually horizontal strips or rectangular groups of pixels) in an effort to distribute the workload of rendering an image, thereby increasing the performance of the multi-GPU system. However, unlike conventional rendering methods, the texture data processed within a particular GPU is not replicated for the other GPUs to have access to each texel of every texture map according to embodiments of the invention. As used herein, the term "texel," or texture element, generally refers to the fundamental unit of a texture map, analogous to a pixel within a displayed image.

Figure 2:
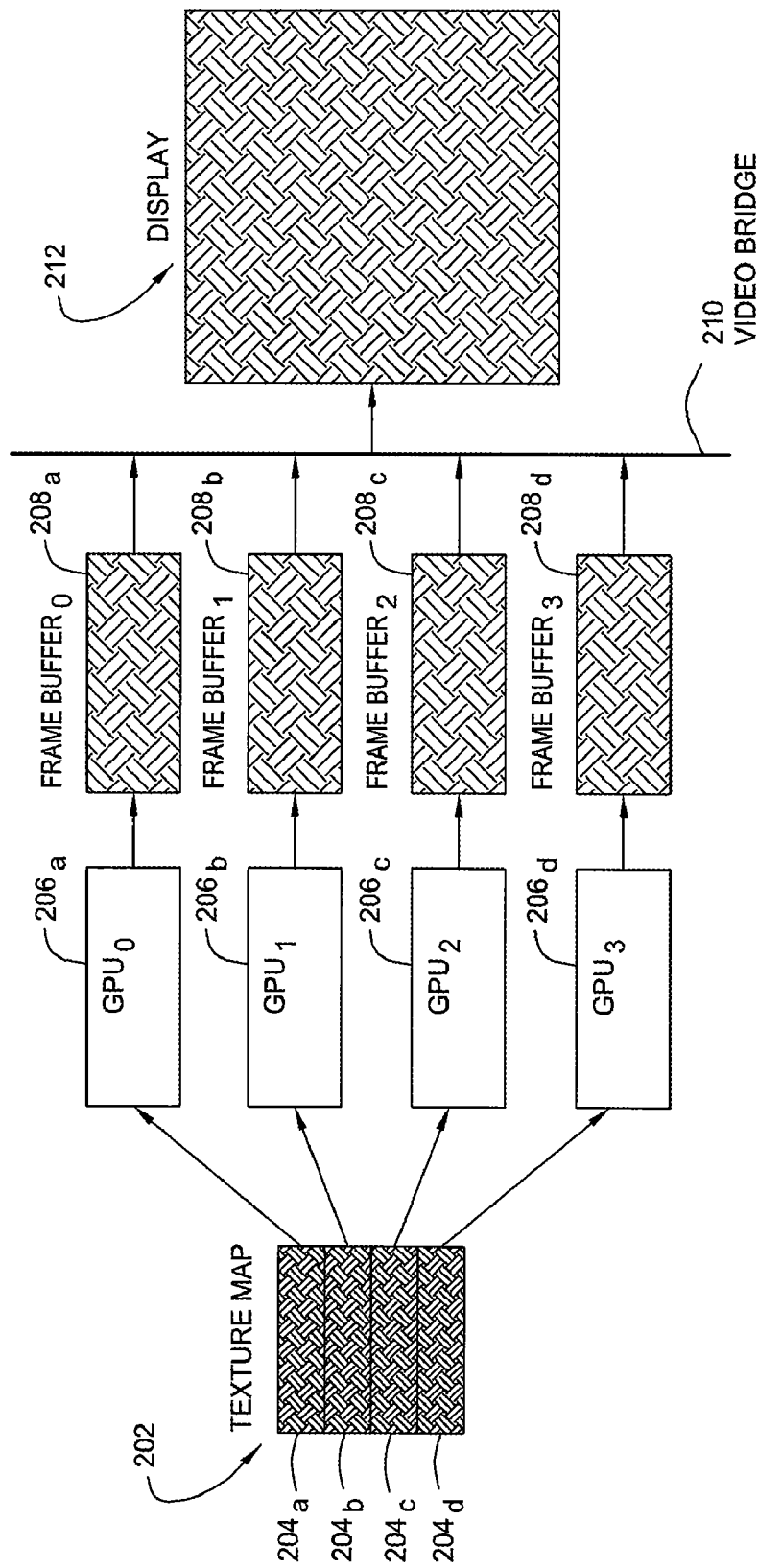
FIG. 2 illustrates distributed rendering of texture data in a multi-GPU system in accordance with an embodiment of the invention.
Figure 3:
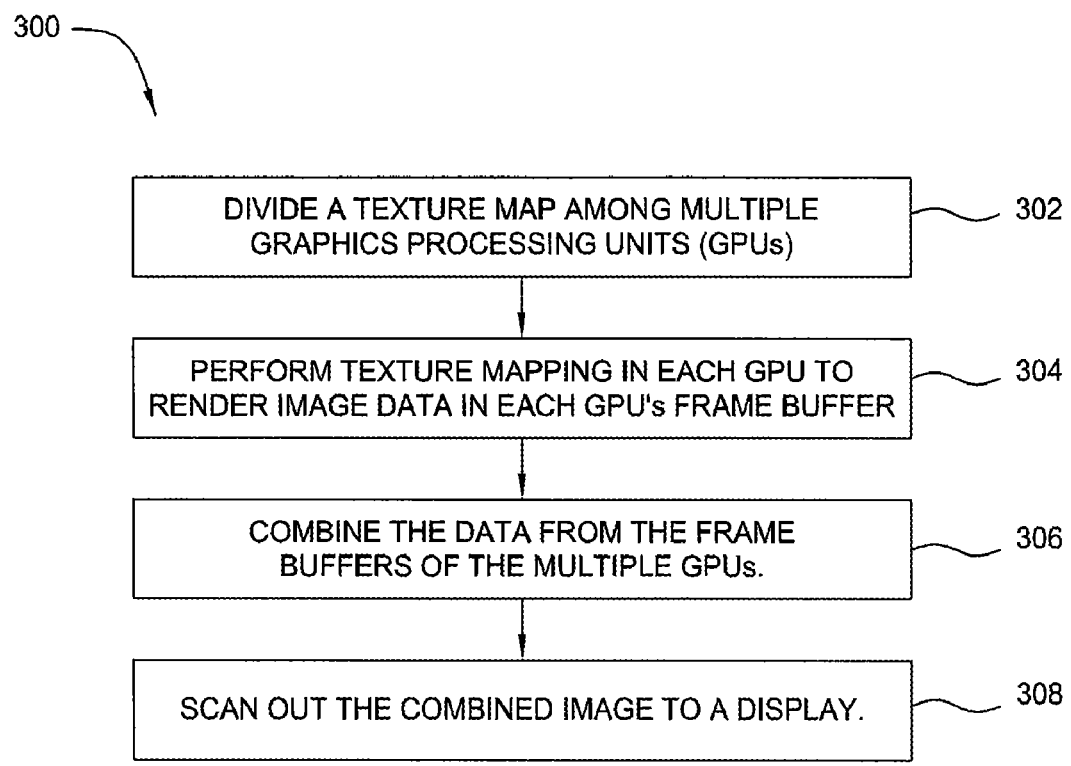
FIG. 3 is a flow diagram of a method for distributing the workload of rendering an image among multiple GPUs in accordance with an embodiment of the invention.

FIG. 2 illustrates a method of distributed rendering of texture data in a multi-GPU system in accordance with embodiments of the invention. The conceptual diagram of FIG. 2 will be described in conjunction with the exemplary flow diagram 300 of FIG. 3. In step 302, a texture map 202 may be divided into a number of substantially equal portions, for example, according to the number of GPUs present in the multi-GPU system. For a four-GPU system, such as the computing system 100 of FIG. 1, the texture map 202 may be divided into four sections 204a-d, and each texture map section may be associated with one of the GPUs 206a-d, as shown in FIG. 2, in an effort to distribute the workload involved in rendering an image. For example, texture map section 204b may be distributed to $GPU_1$ 206b for processing. The texture map sections 204a-d may be horizontal strips of the texture map 202 as shown, although other shapes, such as vertical strips, rectangular blocks, or even arbitrary shapes, may also be employed.

In step 304, within each GPU 206a-d, texture mapping of the corresponding texture map section 204a-d to an associated portion of a destination image may occur, resulting in rendered data 133, 138, 143, 148 and a fractional frame 134, 139, 144, 149. Additional post processing, such as filtering or interpolation, may also occur within each GPU 206a-d. The fractional frame may be stored in a frame buffer 208a-d associated with or embedded within the GPU and may represent a spatially coherent portion of the pixels constituting an image to be displayed.

In this manner, each GPU 206a-d is responsible for only one of the texture map sections 204a-d and for the corresponding portion of the destination image, thereby leading to a shared workload and enhanced system performance. In addition, for a four-GPU system as described, approximately only 25% of each GPU's frame buffer memory that was conventionally required is utilized, leaving about 75% to be allocated for other purposes if desired. For spatially distributed rendering performed according to embodiments of the invention, there should be no interaction between, for example, the uppermost portion of the rendered destination image and the bottommost portion, and therefore, there should be no need to copy rendered data from one GPU to all the other GPUs as was done conventionally.

In one approach to prevent such copying and control the GPUs through the GPU driver(s) 120 in accordance with embodiments of the present invention, an extension to the OpenGL API may be written. Such an extension may permit the graphics application to provide important information (hints) to the graphics system, which may allow for alternatives in situations where the application has potentially more information about multi-GPU relevant usage patterns than simply the distributed rendering of texture data. As used herein, a hint is generally not a graphics command to control multi-GPU rendering, but the hint may provide information about the type of expected graphics usage, such as the expected optimal scaling paradigm or the lifetime of buffer object storage data. The graphics system may decide how to apply the hint.

Figure 4:
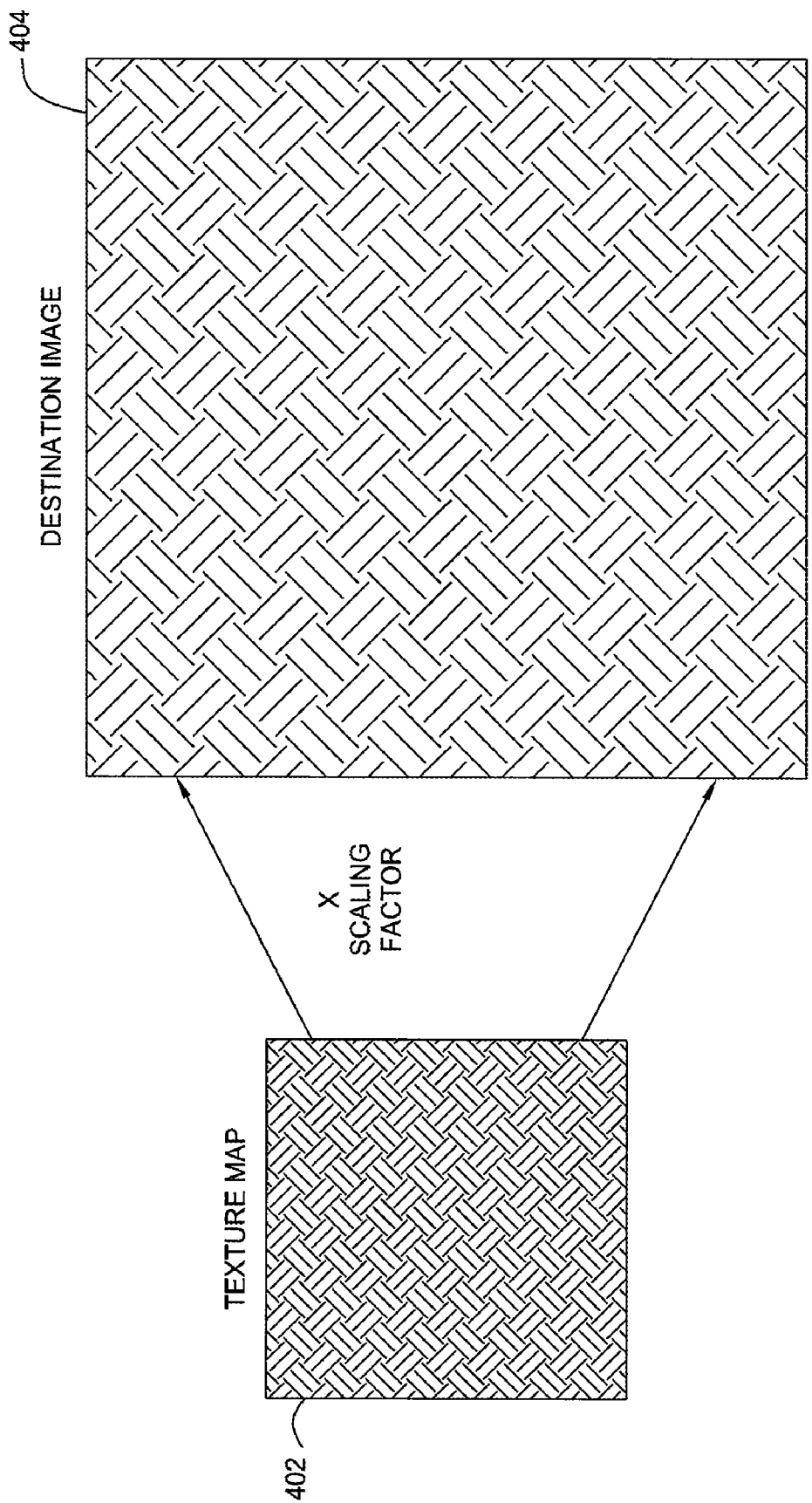
FIG. 4 illustrates scaling between a texture map and a destination image in accordance with an embodiment of the invention.

For distributed rendering of texture data to apply in an optimal manner, according to embodiments of the invention, a texture map 402 may preferably be roughly the identical size or a scaled version of the destination image 404 (i.e., the portion of the rendered scene to which the texture is applied), as shown in FIG. 4. Also to apply, the texture map 302 (or subdivisions thereof) may preferably be mapped on to the destination image 404 as a rectangle where each corner vertex may be mapped onto the same corner vertex of the destination image 404 (or subdivisions thereof) in image space. With these conditions met, the texture map 402 may be rendered onto the destination image 404 such that there is, for the most part, no data dependency across multiple GPUs between texels of the texture and pixels in the destination image 404.

However, an overlap may be defined where texels of the texture map 402 are shared between adjacent texture map sections, usually within a specified, small region. Such overlaps may provide for data dependencies between the texels and pixels at the border between adjacent parts (adjacent texture map sections or adjacent portions of the subdivided destination image 404). In such cases, whichever GPUs 206a-d are responsible for the overlap may perform post processing (e.g., filtering and interpolation for smoothing, blending, etc.) as mentioned above in an effort to resolve pixels at the edge of the split between adjacent parts.

Once the different portions of the destination image have been rendered in the multiple frame buffers 208a-d, the image data may be combined in step 306. For some embodiments, the combination may occur on a video bridge 210, a bus that connects the GPUs 206a-d together and is used for transferring data from the frame buffer of one GPU directly to the next. The individual GPUs may broadcast or post their image data to the video bridge 210. For other embodiments, one of the multiple GPUs 206a-d may be designated to combine the image data and form the destination image. After the various parts of the frame are combined, the completed image data may be written to a visible buffer and/or scanned out to a display 212 in step 308.

It should be mentioned that for subsequent images involving the same texture map 202, each GPU 206a-d may process the same texture map section 204a-d and contribute to the same portion of the destination image. For example, $GPU_3$ 206d may continually operate on texture map section 204d, thereby continually contributing to the bottommost portion of the display 212.

Spatially distributed rendering of texture data as described herein may be combined with other multi-GPU rendering techniques. One particularly efficient technique in the art for utilizing more than one GPU is referred to as "alternate frame rendering (AFR)." This technique distributes the workload for sequential frames to alternating or sequential GPUs. For example, if the computing device includes three GPUs, then rendering frame N may be assigned to GPU 0, rendering frame N+1 may be assigned to GPU 1, rendering frame N+2 may be assigned to GPU 2, rendering frame N+3 may be assigned to GPU 0, and so forth. The workload for sequential frames tends to be relatively consistent in most graphics applications and therefore alternate frame rendering achieves good efficiency by evenly distributing the average workload across the multiple GPUs.

To combine AFR with spatially distributed rendering of texture data, eight different GPUs could be used, for example. Rendering frame N may be assigned to GPUs 0, 1, 2, and 3 in this case where the texture map was split between these four GPUs, and rendering frame N+1 may be assigned to GPUs 4, 5, 6, and 7. GPUs 0 and 4, for instance, may render the same portion of the alternate frames in this example. Rendering frame N+2 may be assigned to GPUs 0, 1, 2, and 3 and so forth.

While the foregoing is directed to embodiments of the present invention, other and further embodiments of the invention may be devised without departing from the basic scope thereof, and the scope thereof is determined by the claims that follow.

We claim:

1. A method for distributed rendering of texture data in a plurality of graphics processing units (GPUs), comprising:
   dividing a texture map into a plurality of texture map sections, wherein each texture map section is associated with one of the plurality of GPUs;
   for each of the plurality of GPUs, performing texture mapping operations using the texture map section associated with the GPU to render image data corresponding to the GPU;
   for each of the plurality of GPUs, storing the image data corresponding to the GPU in a frame buffer associated with the GPU, wherein the image data occupies a portion of the frame buffer proportional to and spatially coherent to the texture map section associated with the GPU; and
   combining the image data corresponding to each of the GPUs to generate a display image, wherein the size of the display image is related to the size of the texture map by a scaling factor.

2. The method of claim 1, wherein corner vertices of the texture map section associated with one of the plurality of GPUs are mapped to corresponding corner vertices in the image data.

3. The method of claim 1, wherein the texture map sections comprise horizontal strips of the texture map.

4. The method of claim 1, wherein dividing the texture map comprises dividing the texture map into a plurality of equally-sized texture map sections.

5. The method of claim 1, wherein combining the image data comprises outputting the image data from each of the GPUs to a video bridge.

6. The method of claim 1, further comprising sharing texels between adjacent texture map sections of the plurality of sections to define an overlap.

7. The method of claim 6, further comprising performing post-processing on the image data corresponding to the overlap.

8. The method of claim 1, wherein the texture mapping is performed and the image data is combined for a graphics application at run-time.

9. The method of claim 1, further comprising scanning out the display image to a display.

10. A graphics processing system for distributed rendering of texture data from a texture map, comprising:
    a plurality of graphics processing units (GPUs), wherein each of the plurality of GPUs is configured to perform texture mapping operations using a texture map section from the texture map associated with the GPU to render image data without replicating the image data to the other GPUs in the plurality, wherein, for each of the plurality of GPUs, the image data corresponding to the GPU is stored in a frame buffer associated with the GPU, and wherein the image data occupies a portion of the frame buffer proportional to and spatially coherent to the texture map section associated with the GPU; and
    a means for combining the image data corresponding to each of the GPUs to generate a display image, wherein the size of the display image is related to the size of the texture map by a scaling factor.

11. The graphics processing system of claim 10, wherein corner vertices of the texture map section associated with one of the plurality of GPUs are mapped to corresponding corner vertices in the image data.

12. The graphics processing system of claim 10, wherein the means for combining the image data is a video bridge.

13. The graphics processing system of claim 10, wherein the means for combining the image data is a designated one of the plurality of GPUs.

14. A computing system for distributed rendering of texture data from a texture map, comprising:
   a central processing unit (CPU) subsystem for executing a graphics application;
   a plurality of graphics processing units (GPUs) coupled to the CPU subsystem, wherein the graphics application utilizes an application programming interface (API) to control the plurality of GPUs such that each of the plurality of GPUs performs texture mapping operations using a texture map section from the texture map associated with the GPU to render image data without replicating the image data to the other GPUs in the plurality, wherein, for each of the plurality of GPUs, the image data corresponding to the GPU is stored in a frame buffer associated with the GPU, and wherein the image data occupies a portion of the frame buffer proportional to and spatially coherent to the texture map section associated with the GPU; and
   a means for combining the image data corresponding to each of the GPUs to generate a frame requested by the graphics application.

15. The computing system of claim 14, wherein the size of the texture map is related to the size of the frame by a scaling factor.

16. The computing system of claim 14, wherein corner vertices of the texture map section associated with one of the plurality of GPUs are mapped to corresponding corner vertices in the image data.

17. The computing system of claim 14, wherein the means for combining the image data is a video bridge.

18. The computing system of claim 14, wherein the API is an extension API to OpenGL.

* * * * *